June 10, 1958  G. PETROCELLI  2,837,823
SCISSORS WITH A COMPOUND BLADE MOVEMENT
Filed March 28, 1957

INVENTOR.
GOBBI PETROCELLI
BY
ATTORNEY

United States Patent Office 2,837,823
Patented June 10, 1958

2,837,823

SCISSORS WITH A COMPOUND BLADE MOVEMENT

Gobbi Petrocelli, Hackensack, N. J.

Application March 28, 1957, Serial No. 649,033

3 Claims. (Cl. 30—239)

This invention relates to the art of scissors or shears and particularly concerns a pivoted two-blade instrument capable of performing a shear and draw or sliding cut simultaneously.

According to the invention there is provided a scissors or shears including a simple rugged structure adapting the instrument to perform the dual type of cut mentioned above.

It is a principal object of the invention to provide a two-blade instrument with balanced cam means for performing simultaneously the shear and sliding cut.

It is a further object to provide novel means for mounting and retaining the cam means on the tool.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4:
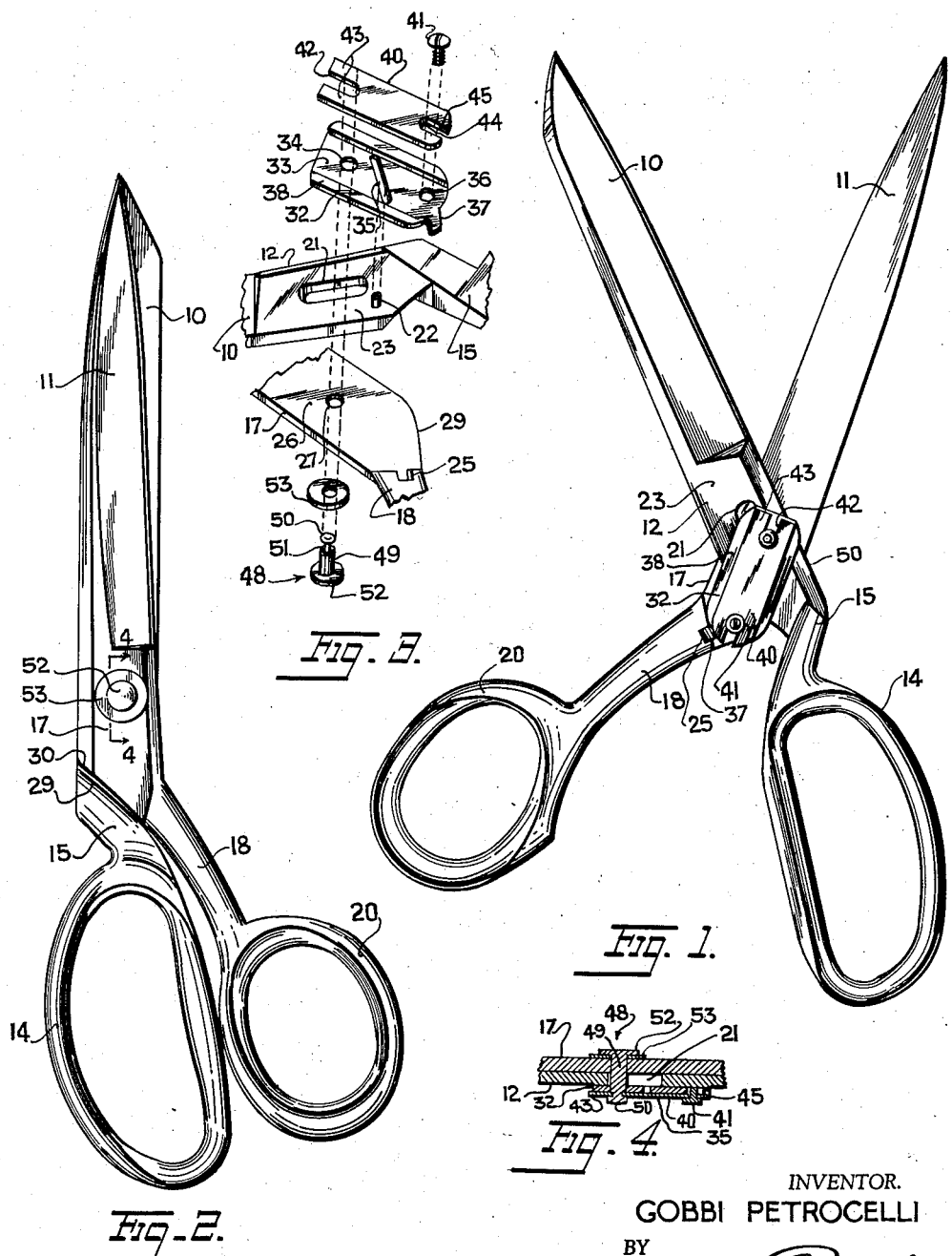
Fig. 1 is a plan view of one side of a shears embodying the invention, the shears being in open condition.
Fig. 2 is a plan view of the other side of the shears shown in closed condition.
Fig. 3 is an exploded perspective view of essential parts of the shears showing details of the cam structure and blade guiding means.
Fig. 4 is an enlarged partial longitudinal sectional view taken on lines 4—4 of Fig. 2.

Referring now to Figs. 1–4, there is shown a pair of shears having a top blade 10 and bottom blade 11. Blade 10 has a straight tang or shank 12 and a finger grip handle 14. Handle 14 is integrally joined to the shank by an angularly offset connecting section 15. Blade 11 has a shank 17 connected by an offset section 18 to a thumb engaging handle 20. Shank 12 is formed with a longitudinally extending centrally disposed slot 21. A pin 22 is disposed near slot 21 in an upstanding position with respect to the side 23 of the shank 12. A recess or notch 25 is provided in the body of section 18 where it joins the inner bearing side 26 of shank 17. A round aperture 27 is centrally located in shank 17. Shank 17 is provided with a curved camming end portion 29 adjoining section 18.

Shank 12 is provided with a cam following corner portion 30. Overlying shank 12 and disposed so that its central axis is parallel to the central axis of shank 17 is a cam plate 32. This plate, as best shown in Fig. 3, has a recess 33 in which is a round aperture 34 and an obliquely disposed slot 35. Another aperture 36 is located near the end of the plate. Depending from one end of the plate is a tongue 37. This tongue fits into the recess 25. Pin 22 fits into slot 35. The recess or channel 33 is defined by lateral ridges 38 in which fits a retainer plate or bar 40. Aperture 36 is threaded and a screw 41 is provided to be secured in this aperture. Bar 40 is provided with two terminal notches 42 and 44 which define fingers 43 and 45. The shank of screw 41 passes through notch 44 to secure the bar 40 at one end in the recess 33 on plate 32. A pin 48 having a cylindrical shank 49 is provided to pass through aperture 27, slot 21, and aperture 34. The shank terminates in a knob 50 defined by an undercut groove 51 near the free end thereof. Fingers 43 engage under the knob 50 in groove 51 since the width of notch 42 is less than the diameter of the knob. Pin 48 has a head 52 and a flat ring washer 53 is provided to engage between the head 52 and the outer side of shank 17.

When the blades of the shears are to be closed from the open position shown in Fig. 1, blade 10 moves in an oblique curved path in a clockwise direction as the corner 30 is guided in a curved path over camming surface 29. At the same time pin 22 is guided in the obliquely disposed camming slot 35 so that the two blades are balanced on pin 48. As the blade 10 moves obliquely with respect to blade 11, the abutting bearing surfaces of shanks 12 and 17 slide with respect to each other while shank 49 moves from end to end of slot 21. On the opening motion of the blades they are guided in a corresponding oppositely directed oblique path from the previous path of motion. The blades 10, 11 thus perform a sliding and shearing cutting function simultaneously.

While I have illustrated and described the preferred embodiment of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A pair of shears or scissors, comprising a pair of angularly separable blades, each of said blades having a substantially straight integrally formed shank, one of said shanks having a centrally disposed aperture, a connecting section joined to said one shank, a notch formed in said section, the other of said shanks having a longitudinally extending elongated slot centrally disposed therein and a fixed pin upstanding therefrom near the slot, another connecting section integrally formed with said other shank, said one shank being formed with a camming corner surface, said other section being formed with a cam following corner, a cam plate disposed to overlie one side of said other shank, said plate having a channel formed therein, two apertures with an obliquely disposed slot being formed in the bottom of said channel, said plate being further formed with a terminal depending tongue adapted to engage in said notch, a retainer bar disposed in said channel, said bar having two notches overlying the apertures in said plate, said pin being arranged to slidably fit into said obliquely disposed slot in the plate, said bar having the notches at opposite ends thereof, a pin having a cylindrical shank with a knob at one end and a head at the other end, said cylindrical shank being extended through the aperture in said one shank, the elongated slot in the other shank and one aperture in said plate, said knob extending beyond one notch in said bar to lock the bar to the plate, and a screw extending through the other notch in the bar and being threaded in the other aperture in said plate.

2. A pair of shears or scissors, comprising a pair of angularly separable blades, each of said blades having a substantially straight integrally formed shank, one of said shanks having a centrally disposed aperture, the other of said shanks having a longitudinally extending elongated slot centrally disposed therein and a fixed pin upstanding therefrom near the slot, another connecting section integrally formed with said other shank, said one shank being formed with a camming corner surface, said other section being formed with a cam surface following corner, a cam plate disposed to overlay one side of said other shank, said plate having a channel formed therein, two apertures with an obliquely disposed slot being formed in the bottom of said channel, a retainer bar disposed in said channel, said bar having two notches overlaying the apertures in said plate, said pin being arranged to slidably fit into said obliquely disposed slot in the plate, said bar having the notches at opposite ends thereof, a pin having a cylindrical shank with a knob at one end and a head at the other end, said cylindrical shank being extended through the aperture in said one shank, the elongated slot in the other shank and one aperture in said plate, said knob extending beyond one notch in said bar to lock the bar to the plate, and a screw extending through the other notch in the bar and being threaded in the other aperture in said plate.

3. A pair of shears, comprising a pair of angularly separable blades, each of said blades having a substantially straight integrally formed shank, one of said shanks having a centrally disposed aperture, the other of said shanks having a longitudinally extending elongated slot centrally disposed therein and a fixed pin upstanding therefrom near the slot, another connecting section integrally formed with said other shank, a cam plate disposed to overlay one side of said other shank, said plate having a channel formed therein, two apertures with an obliquely disposed slot being formed in the bottom of said channel, a retainer bar disposed in said channel, said bar having two notches overlaying the apertures in said plate, said pin being arranged to slidably fit into said obliquely disposed slot in the plate, said bar having the notches at opposite ends thereof, a pin having a cylindrical shank with a knob at one end and a head at the other end, said cylindrical shank being extended through the aperture in said one shank, the elongated slot in the other shank and one aperture in said plate, said knob extending beyond one notch in said bar to lock the bar to the plate, and a screw extending through the other notch in the bar and being threaded in the other aperture in said plate.

References Cited in the file of this patent

UNITED STATES PATENTS

| | | |
|---|---|---|
| 467,025 | Wreden | Jan. 12, 1892 |
| 556,644 | Rivard | Mar. 17, 1896 |

FOREIGN PATENTS

| | | |
|---|---|---|
| 270 | Great Britain | of 1893 |
| 3,693 | Great Britain | of 1893 |
| 17,238 | Germany | Mar. 25, 1882 |
| 161,139 | Great Britain | Mar. 31, 1921 |